United States Patent
Umino et al.

(10) Patent No.: US 8,734,943 B2
(45) Date of Patent: May 27, 2014

(54) RESIN COMPOSITION, TWO-PACK TYPE ADHESIVE FOR LAMINATES, MULTILAYER FILM, AND BACK SHEET FOR SOLAR CELLS

(75) Inventors: Akio Umino, Ichihara (JP); Seiichi Uno, Ichihara (JP); Noriyuki Ichinose, Takaishi (JP); Kouji Akita, Tokyo (JP); Masami Hozumi, Tokyo (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 14/113,030

(22) PCT Filed: Apr. 5, 2012

(86) PCT No.: PCT/JP2012/059338
§ 371 (c)(1),
(2), (4) Date: Oct. 21, 2013

(87) PCT Pub. No.: WO2012/144329
PCT Pub. Date: Oct. 26, 2012

(65) Prior Publication Data
US 2014/0050919 A1 Feb. 20, 2014

(30) Foreign Application Priority Data
Apr. 22, 2011 (JP) .................... 2011-096062

(51) Int. Cl.
*B32B 7/12* (2006.01)
*B32B 15/04* (2006.01)
*C08G 18/28* (2006.01)

(52) U.S. Cl.
USPC .............. 428/343; 428/355 R; 525/457

(58) Field of Classification Search
USPC ................ 428/343, 355 R; 525/457
See application file for complete search history.

(56) References Cited

U.S. PATENT DOCUMENTS

| | | | |
|---|---|---|---|
| 6,596,819 B2 * | 7/2003 | Morikawa et al. | ............ 525/457 |
| 2010/0249360 A1 | 9/2010 | Imai et al. | |
| 2011/0104482 A1 | 5/2011 | Yasui et al. | |

FOREIGN PATENT DOCUMENTS

| | | |
|---|---|---|
| JP | 08-120250 A | 5/1996 |
| JP | 2010-043238 A | 2/2010 |
| WO | WO-2009/072431 A1 | 6/2009 |

OTHER PUBLICATIONS

International Search Report dated Jun. 5, 2013, issued for PCT/JP2012/059338.

* cited by examiner

*Primary Examiner* — Victor Chang
(74) *Attorney, Agent, or Firm* — Edwards Wildman Palmer LLP

(57) ABSTRACT

Provided are a resin composition with high adhesion to substrates under hot and humid conditions, a two-part laminate adhesive containing the resin composition, and a laminated film and backsheet for solar cells including a layer of the adhesive. The resin composition contains, as essential components, a polyester polyurethane polyol (A) having a branched structure in a molecule thereof and having a weight average molecular weight (Mw) of 25,000 to 200,000 and a molecular weight distribution (Mw/Mn) of 2.5 to 25; a hydroxyl-containing epoxy resin (B) having a number average molecular weight (Mn) of 300 to 5,000; a hydroxyl-containing polycarbonate resin (C) having a number average molecular weight (Mn) of 300 to 3,000; and a polyisocyanate (D).

16 Claims, No Drawings

RESIN COMPOSITION, TWO-PACK TYPE ADHESIVE FOR LAMINATES, MULTILAYER FILM, AND BACK SHEET FOR SOLAR CELLS

TECHNICAL FIELD

The present invention relates to resin compositions, two-part laminate adhesives, laminated films, and backsheets for solar cells with high adhesion to substrates under hot and humid conditions.

BACKGROUND ART

Recently, solar power has attracted attention as a typical clean energy. Backsheets disposed on the backmost surfaces of solar modules are members for protecting a generation mechanism including cells and wiring from the external environment to maintain insulation, and are composed of various functional films laminated with an adhesive. The adhesive used for such backsheets requires high adhesion to various films with different characteristics, such as polyester films and polyvinyl fluoride films, and a high level of heat and moisture resistance sufficient to maintain adhesion for an extended period of time in outdoor environments.

One known adhesive for backsheets is a two-part polyurethane adhesive containing, as a main agent, a polyester polyurethane polyol prepared by reacting a polyester polyol with isophorone diisocyanate and, as a curing agent, isophorone diisocyanate trimer (see PTL 1). The polyester polyol is prepared by reacting neopentyl glycol, 1,6-hexanediol, ethylene glycol, isophthalic acid, and sebacic acid. However, since such an adhesive containing a polyester polyurethane polyol having no branched structure has low crosslink density when finally cured, the cured adhesive swells easily and exhibits decreased adhesion under hot and humid conditions. Thus, this adhesive has low adhesion to substrates under hot and humid conditions.

CITATION LIST

Patent Literature

PTL 1: Japanese Unexamined Patent Application Publication No. 2010-43238

SUMMARY OF INVENTION

Technical Problem

Accordingly, an object of the present invention is to provide a resin composition with high adhesion to substrates under hot and humid conditions, a two-part laminate adhesive containing the resin composition, and a laminated film and backsheet for solar cells including a layer of the adhesive.

Solution to Problem

After performing extensive research to achieve the above object, the present inventors have found that the use of a resin composition containing, as a main agent, a polyester polyurethane polyol having a branched structure in the molecule thereof and having a weight average molecular weight (Mw) of 25,000 to 200,000 and a molecular weight distribution (Mw/Mn) of 2.5 to 25 provides a two-part laminate adhesive with high adhesion to substrates under hot and humid conditions, thus completing the present invention.

Specifically, the present invention relates to a resin composition containing, as essential components, a polyester polyurethane polyol (A) having a branched structure in a molecule thereof and having a weight average molecular weight (Mw) of 25,000 to 200,000 and a molecular weight distribution (Mw/Mn) of 2.5 or more; a hydroxyl-containing epoxy resin (B) having a number average molecular weight (Mn) of 300 to 5,000; a hydroxyl-containing polycarbonate resin (C) having a number average molecular weight (Mn) of 300 to 3,000; and a polyisocyanate (D).

The present invention also relates to a two-part laminate adhesive containing the resin composition.

The present invention also relates to a laminated film including a layer of the two-part laminate adhesive.

The present invention also relates to a backsheet for solar cells including a layer of the two-part laminate adhesive.

Advantageous Effects of Invention

The present invention provides a two-part laminate adhesive with higher adhesion to substrates under hot and humid conditions than conventional two-part laminate adhesives.

DESCRIPTION OF EMBODIMENTS

A resin composition of the present invention contains, as an essential component, a polyester polyurethane polyol (A) having a branched structure in the molecule thereof and having a weight average molecular weight (Mw) of 25,000 to 200,000 and a molecular weight distribution (Mw/Mn) of 2.5 to 25.

Because the polyester polyurethane polyol (A) has a branched structure in the molecule thereof, the resin composition has high crosslink density when finally cured. The resin composition can therefore maintain high adhesion without swelling under hot and humid conditions.

The polyester polyurethane polyol (A) has a weight average molecular weight (Mw) of 25,000 to 200,000. Because the polyester polyurethane polyol (A) has a weight average molecular weight (Mw) within the above range, the resin composition has high strength when cured and thus has high initial adhesive strength. The resin composition also has viscosity suitable for application. If the polyester polyurethane polyol (A) has a weight average molecular weight (Mw) of less than 25,000, the resin composition has decreased initial adhesive strength and is also difficult to uniformly apply because of its low viscosity. If the polyester polyurethane polyol (A) has a weight average molecular weight (Mw) of more than 200,000, the resin composition is difficult to apply because of its high viscosity. In particular, the polyester polyurethane polyol (A) preferably has a weight average molecular weight (Mw) of 30,000 to 100,000 so that the resin composition has high initial adhesive strength and high adhesion to substrates under hot and humid conditions.

The polyester polyurethane polyol (A) has a molecular weight distribution (Mw/Mn) of 2.5 or more. Because the polyester polyurethane polyol (A) has a molecular weight distribution (Mw/Mn) within the above range, the resin composition simultaneously achieves improved adhesion to substrates due to low-molecular-weight components and high strength when cured due to high-molecular-weight components. The resin composition therefore has high adhesion to substrates under hot and humid conditions and high initial adhesive strength. If the polyester polyurethane polyol (A) has a molecular weight distribution (Mw/Mn) of less than 2.5, the resin composition has decreased initial adhesive strength.

In particular, the polyester polyurethane polyol (A) preferably has a molecular weight distribution (Mw/Mn) of 3 to 25, more preferably 4 to 15, and even more preferably 6 to 10, so that the resin composition has higher adhesion to substrates under hot and humid conditions.

The polyester polyurethane polyol (A) preferably has a number average molecular weight (Mn) of 3,000 to 20,000, more preferably 5,000 to 10,000, and even more preferably 5,500 to 8,000, so that the resin composition has high adhesion to substrates under hot and humid conditions and viscosity suitable for application.

In the present invention, the weight average molecular weight (Mw) and the number average molecular weight (Mn) are measured by gel permeation chromatography (GPC) under the following conditions.

Measurement apparatus: HLC-8220 GPC from Tosoh Corporation

Columns: TSK-GUARDCOLUMN SuperHZ-L from Tosoh Corporation+TSK-GEL SuperHZM-M×4 from Tosoh Corporation Detector: differential refractive index (RI) detector Data processing: Multistation GPC-8020 model II from Tosoh Corporation Measurement conditions:

Column temperature 40° C.

Solvent tetrahydrofuran

Flow rate 0.35 ml/min

Standard: monodisperse polystyrene

Sample: microfiltered resin solution in tetrahydrofuran with solid content of 0.2% by mass (100 µl)

The polyester polyurethane polyol (A) preferably has a hydroxyl value of 5 to 30 mg KOH/g, more preferably 7 to 15 mg KOH/g, so that the resin composition has high adhesion to substrates under hot and humid conditions.

The polyester polyurethane polyol (A) is prepared, for example, by reacting a polybasic acid (E), a polyalcohol (F), and a polyisocyanate (G). In this case, a compound having a functionality of 3 or more is used as at least one of the polybasic acid (E), the polyalcohol (F), and the polyisocyanate (G) to introduce a branched structure into the molecule of the polyester polyurethane polyol (A).

The polybasic acid (E) may be a dibasic acid (E1) or a polybasic acid (E2) having a functionality of 3 or more.

Examples of dibasic acids (E1) include aliphatic dibasic acids such as malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, heptadecanedioic acid, octadecanedioic acid, nonadecanedioic acid, and icosanedioic acid;

aliphatic unsaturated dibasic acids and anhydrides such as tetrahydrophthalic acid, maleic acid, maleic anhydride, fumaric acid, citraconic acid, itaconic acid, and glutaconic acid;

alicyclic dibasic acids such as hexahydrophthalic acid and 1,4-cyclohexanedicarboxylic acid; and aromatic dibasic acids and anhydrides such as phthalic acid, phthalic anhydride, terephthalic acid, isophthalic acid, and orthophthalic acid.

Examples of polybasic acids (E2) having a functionality of 3 or more include aliphatic tribasic acids such as 1,2,5-hexanetricarboxylic acid and 1,2,4-cyclohexanetricarboxylic acid; and aromatic tribasic acids and anhydrides such as trimellitic acid, trimellitic anhydride, 1,2,5-benzenetricarboxylic acid, and 2,5,7-naphthalenetricarboxylic acid.

If such a polybasic acid (E2) having a functionality of 3 or more is used, a branched structure can be introduced into the molecule of the polyester polyurethane polyol (A) of the present invention.

These polybasic acids (E) may be used alone or in a combination of two or more. In particular, a combination of an aliphatic polybasic acid and an aromatic polybasic acid is preferably used so that the resin composition has high adhesion to substrates under hot and humid conditions and viscosity suitable for application. The content of the aliphatic polybasic acid in all polybasic acid components is preferably 20 to 50 mole percent, more preferably 25 to 40 mole percent. To provide a resin composition with higher adhesion to substrates under hot and humid conditions, aliphatic polybasic acids having 6 to 20 carbon atoms are preferred, including adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, heptadecanedioic acid, octadecanedioic acid, nonadecanedioic acid, icosanedioic acid, 1,2,5-hexanetricarboxylic acid, and 1,2,4-cyclohexanetricarboxylic acid. More preferred are aliphatic polybasic acids having 8 to 13 carbon atoms, including suberic acid, azelaic acid, sebacic acid, undecanedioic acid, dodecanedioic acid, tridecanedioic acid, 1,2,5-hexanetricarboxylic acid, and 1,2,4-cyclohexanetricarboxylic acid.

In the present invention, monocarboxylic acids may also be used as a raw material for the polyester polyurethane polyol (A) to adjust the molecular weight and viscosity of the polyester polyurethane polyol (A). Examples of monocarboxylic acids include methanoic acid, ethanoic acid, propanoic acid, butanoic acid, pentanoic acid, hexanoic acid, heptanoic acid, octanoic acid, nonanoic acid, decanoic acid, dodecanoic acid, tetradecanoic acid, hexadecanoic acid, heptadecanoic acid, octadecanoic acid, and benzoic acid.

The polyalcohol (F) may be a diol (F1) or a polyol (F2) having a functionality of 3 or more.

Examples of diols (F1) include aliphatic diols such as ethylene glycol, diethylene glycol, propylene glycol, 1,3-propanediol, 1,2,2-trimethyl-1,3-propanediol, 2,2-dimethyl-3-isopropyl-1,3-propanediol, 1,4-butanediol, 1,3-butanediol, 3-methyl-1,3-butanediol, 1,5-pentanediol, 3-methyl1,5-pentanediol, neopentyl glycol, 1,6-hexanediol, 1,4-bis(hydroxymethyl)cyclohexane, and 2,2,4-trimethyl-1,3-pentanediol;

ether glycols such as polyoxyethylene glycol and polyoxypropylene glycol;

modified polyether diols prepared by ring-opening polymerization of the aliphatic diols with various cyclic-ether containing compounds such as ethylene oxide, propylene oxide, tetrahydrofuran, ethyl glycidyl ether, propyl glycidyl ether, butyl glycidyl ether, phenyl glycidyl ether, and allyl glycidyl ether;

lactone polyester polyols prepared by polycondensation reactions of the aliphatic diols with various lactones such as ε-caprolactone;

bisphenols such as bisphenol A and bisphenol F; and alkylene oxide adducts of bisphenols prepared by adding alkylene oxides such as ethylene oxide and proplene oxide to bisphenols such as bisphenol A and bisphenol F.

Examples of polyols (F2) having a functionality of 3 or more include aliphatic polyols such as trimethylolethane, trimethylolpropane, glycerol, hexanetriol, and pentaerythritol;

modified polyether polyols prepared by ring-opening polymerization of the aliphatic polyols with various cyclic-ether containing compounds such as ethylene oxide, propylene oxide, tetrahydrofuran, ethyl glycidyl ether, propyl glycidyl ether, butyl glycidyl ether, phenyl glycidyl ether, and allyl glycidyl ether; and lactone polyester polyols prepared by polycondensation reactions of the aliphatic polyols with various lactones such as ε-caprolactone.

If such a polyol (F2) having a functionality of 3 or more is used, a branched structure can be introduced into the molecule of the polyester polyurethane polyol (A) of the present invention.

These polyalcohols (F) may be used alone or in a combination of two or more. In particular, the content of the aliphatic polyalcohols in all polyalcohol components is preferably 50 mole percent or more, more preferably 80 mole percent or more, so that the resin composition is suitable for application. The aliphatic polyols are preferably the aliphatic diols so that the resin composition has higher adhesion to substrates under hot and humid conditions.

The polyisocyanate (G) may be a diisocyanate compound (G1) or a polyisocyanate compound (G2) having a functionality of 3 or more.

Examples of diisocyanate compounds (G1) include aliphatic diisocyanates such as butane-1,4-diisocyanate, hexamethylene diisocyanate, 2,2,4-trimethylhexamethylene diisocyanate, 2,4,4-trimethylhexamethylene diisocyanate, xylylene diisocyanate, and m-tetramethylxylylene diisocyanate;

alicyclic diisocyanates such as cyclohexane-1,4-diisocyanate, isophorone diisocyanate, lysine diisocyanate, dicyclohexylmethane-4,4'-diisocyanate, 1,3-bis(isocyanatomethyl)cyclohexane, methylcyclohexane diisocyanate, isopropylidenedicyclohexyl-4,4'-diisocyanate, and norbornane diisocyanate; and aromatic diisocyanates such as 1,5-naphthylene diisocyanate, 4,4'-diphenylmethane diisocyanate, 4,4'-diphenyldimethylmethane diisocyanate, 4,4'-dibenzyl diisocyanate, dialkyldiphenylmethane diisocyanate, tetraalkyldiphenylmethane diisocyanate, 1,3-phenylene diisocyanate, 1,4-phenylene diisocyanate, tolylene diisocyanate, xylylene diisocyanate, and tetramethylxylylene diisocyanate.

Examples of polyisocyanate compounds (G2) having a functionality of 3 or more include adduct-type polyisocyanate compounds, which have a urethane bond site in the molecule thereof, and nurate-type polyisocyanate compounds, which have an isocyanurate ring structure in the molecule thereof.

Adduct-type polyisocyanate compounds, which have a urethane bond site in the molecule thereof, are prepared, for example, by reacting a diisocyanate compound with a polyalcohol. Examples of diisocyanate compounds used for the reaction include the various diisocyanate compounds illustrated for the diisocyanate compound (G1), which may be used alone or in a combination of two or more. Examples of polyol compounds used for the reaction include the various polyol compounds illustrated for the polyalcohol (F) and polyester polyols prepared by reacting a polyalcohol with a polybasic acid, which may be used alone or in a combination of two or more.

Nurate-type polyisocyanate compounds, which have an isocyanurate ring structure in the molecule thereof, are prepared, for example, by reacting a diisocyanate compound with a monoalcohol and/or a diol. Examples of diisocyanate compounds used for the reaction include the various diisocyanate compounds illustrated for the diisocyanate compound, which may be used alone or in a combination of two or more. Examples of monoalcohols used for the reaction include hexanol, 2-ethylhexanol, octanol, n-decanol, n-undecanol, n-dodecanol, n-tridecanol, n-tetradecanol, n-pentadecanol, n-heptadecanol, n-octadecanol, n-nonadecanol, eicosanol, 5-ethyl-2-nonanol, trimethylnonyl alcohol, 2-hexyldecanol, 3,9-diethyl-6-tridecanol, 2-isoheptylisoundecanol, 2-octyldodecanol, and 2-decyltetradecanol. Examples of diols include the aliphatic diols illustrated for the polyalcohol (F). These monoalcohols and diols may be used alone or in a combination of two or more.

If such a polyisocyanate compound (G2) having a functionality of 3 or more is used, a branched structure can be introduced into the molecule of the polyester polyurethane polyol (A) of the present invention.

These polyisocyanates (G) may be used alone or in a combination of two or more. In particular, the polyisocyanate compounds (G2) having a functionality of 3 or more are preferably used, and the nurate-type polyisocyanate compounds are more preferably used, so that the resin composition has high adhesive strength under hot and humid conditions. Also, a combination of a diisocyanate compound (G1) and a polyisocyanate compound (G2) having a functionality of 3 or more is preferably used so that the resin composition can be easily adjusted to a viscosity suitable for application. In this case, the mass ratio thereof [(G1)/(G2)] is preferably 50/50 to 5/95, more preferably 40/60 to 10/90, and even more preferably 30/70 to 15/85, so that the resin composition has high adhesion to substrates under hot and humid conditions and viscosity suitable for application.

The component having a functionality of 3 or more that is used for the manufacture of the polyester polyurethane polyol (A) may be any of the polybasic acid (E2), the polyol (F2), and the polyisocyanate compound (G2), although the polyisocyanate compound (G2) is preferably used so that the resin composition has high adhesive strength under hot and humid conditions, as described above, and so that the polyester polyurethane polyol (A) can be manufactured in a simpler manner within a shorter period of time.

The polyester polyurethane polyol (A) may be manufactured, for example, by reacting the polybasic acid (E) with the polyalcohol (F) in the presence of an esterification catalyst in the temperature range of 150° C. to 270° C. to prepare a polyester polyol and then reacting the polyester polyol with the polyisocyanate (G) in the presence of a urethanization catalyst in the temperature range of 50° C. to 100° C.

The resin composition of the present invention contains a hydroxyl-containing epoxy resin (B) having a number average molecular weight (Mn) of 300 to 5,000, which provides high adhesion to fluoropolymer substrates such as PVF films and PVDF films, which generally have low adhesion. If the epoxy resin (B) has a number average molecular weight (Mn) of less than 300, the resin composition has insufficient adhesive strength. If the epoxy resin (B) has a number average molecular weight (Mn) of more than 5,000, its solubility in the resin composition of the present invention decreases. In particular, the hydroxyl-containing epoxy resin (B) preferably has a number average molecular weight (Mn) of 400 to 2,000 so that it has higher solubility in the resin composition of the present invention and so that the resin composition has higher adhesion to substrates under hot and humid conditions.

The epoxy resin preferably has a hydroxyl group in the molecular structure thereof so that the resin composition has higher curability. In particular, the epoxy resin preferably has a hydroxyl value of 30 to 160 mg KOH, more preferably 50 to 150 mg KOH/g.

Examples of hydroxyl-containing epoxy resins (B) include bisphenol epoxy resins such as bisphenol A epoxy resin and bisphenol F epoxy resin; biphenyl epoxy resins such as biphenyl epoxy resin and tetramethylbiphenyl epoxy resin; and dicyclopentadiene-phenol adduct epoxy resins. These may be used alone or in a combination of two or more. In particular, bisphenol epoxy resins are preferably used so that the resin composition has high adhesion to substrates under hot and humid conditions and high initial adhesive strength.

The resin composition of the present invention contains a hydroxyl-containing polycarbonate resin (C) having a number average molecular weight (Mn) of 300 to 3,000, which provides high adhesion to substrates under hot and humid conditions. If the polycarbonate resin (C) has a number average molecular weight (Mn) of less than 300, the resin composition has insufficient adhesive strength. If the polycarbonate resin (C) has a number average molecular weight (Mn) of more than 3,000, its solubility in the resin composition of the present invention decreases. In particular, the hydroxyl-containing polycarbonate resin (C) preferably has a number average molecular weight (Mn) of 400 to 2,000 so that it has higher solubility in the resin composition of the present invention and so that the resin composition has higher adhesion to substrates under hot and humid conditions.

The hydroxyl-containing polycarbonate resin (C) preferably has a hydroxyl value of 20 to 300 mg KOH/g, more preferably 40 to 250 mg KOH/g, so that the resin composition has higher curability. Also, the hydroxyl-containing polycarbonate resin (C) is preferably a polycarbonate diol so that the resin composition has high adhesion to substrates under hot and humid conditions.

The hydroxyl-containing polycarbonate resin (C) can be manufactured, for example, by a polycondensation reaction of a polyalcohol with a carbonylation agent.

Examples of polyalcohols used for the manufacture of the hydroxyl-containing polycarbonate resin (C) include the various polyalcohols illustrated for the polyalcohol (F). Such polyalcohols may be used alone or in a combination of two or more.

Examples of carbonylation agents used for the manufacture of the hydroxyl-containing polycarbonate resin (C) include ethylene carbonate, propylene carbonate, dimethyl carbonate, diethyl carbonate, dibutyl carbonate, and diphenyl carbonate. These may be used alone or in a combination of two or more.

If the resin composition of the present invention contains the hydroxyl-containing epoxy resin (B) in an amount of 5 to 20 parts by mass and the hydroxyl-containing polycarbonate resin (C) in an amount of 5 to 20 parts by mass per 100 parts by mass of the polyester polyurethane polyol (A), the resin composition has high adhesion to various substrates and can maintain high adhesion to substrates under hot and humid conditions.

The polyisocyanate (D) in the resin composition of the present invention acts as a curing agent that reacts with the hydroxyl groups contained in the polyester polyurethane polyol (A), the hydroxyl-containing epoxy resin (B), and the hydroxyl-containing polycarbonate resin (C). Examples of polyisocyanates (D) include the various polyisocyanates illustrated for the polyisocyanate (G). These polyisocyanates (D) may be used alone or in a combination of two or more.

Among these polyisocyanates (D), the aliphatic diisocyanate compounds are preferably used so that the adhesive coating is resistant to yellowing. Also, the nurate-type polyisocyanate compounds are preferably used so that the resin composition has high adhesion to substrates under hot and humid conditions.

The resin composition of the present invention contains, as essential components, the polyester polyurethane polyol (A), the hydroxyl-containing epoxy resin (B), the hydroxyl-containing polycarbonate resin (C), and the polyisocyanate (D).

In the present invention, the ratio [OH]/[NCO] of the total number of moles [OH] of hydroxyl groups contained in the polyester polyurethane polyol (A), the hydroxyl-containing epoxy resin (B), and the hydroxyl-containing polycarbonate resin (C) to the number of moles [NCO] of isocyanate groups contained in the polyisocyanate compound (D) is preferably 1/1 to 1/2, more preferably 1/1.05 to 1/1.5, so that the resin composition has higher curability.

The resin composition of the present invention may contain hydroxyl-containing compounds other than the polyester polyurethane polyol (A), the hydroxyl-containing epoxy resin (B), and the hydroxyl-containing polycarbonate resin (C). Examples of such hydroxyl-containing compounds include polyester polyols prepared by reacting a polybasic acid and a polyalcohol; polyester polyurethane polyols prepared by reacting a polybasic acid, a polyalcohol, and a polyisocyanate and having a number average molecular weight (Mn) of less than 25,000; linear polyester polyurethane polyols prepared by reacting a dibasic acid, a diol, and a diisocyanate; ether glycols such as polyoxyethylene glycol and polyoxypropylene glycol; bisphenols such as bisphenol A and bisphenol F; and alkylene oxide adducts of bisphenols prepared by adding alkylene oxides such as ethylene oxide and propylene oxide to the bisphenols. These may be used alone or in a combination of two or more.

If the resin composition of the present invention contains hydroxyl-containing compounds other than the polyester polyurethane polyol (A), the hydroxyl-containing epoxy resin (B), and the hydroxyl-containing polycarbonate resin (C), the content thereof is preferably 5 to 20 parts by mass per 100 parts by mass of the polyester polyurethane polyol (A) so that the resin composition has high adhesion to various substrates and can maintain high adhesion to substrates under hot and humid conditions.

If the resin composition of the present invention contains hydroxyl-containing compounds other than the polyester polyurethane polyol (A), the hydroxyl-containing epoxy resin (B), and the hydroxyl-containing polycarbonate resin (C), the ratio [OH]/[NCO] of the total number of moles [OH] of hydroxyl groups contained in the composition to the number of moles [NCO] of isocyanate groups contained in the polyisocyanate compound (D) is preferably 1/1 to 1/2, more preferably 1/1.05 to 1/1.5, so that the resin composition has high curability.

The resin composition of the present invention may further contain various solvents. Examples of solvents include, for example, ketone compounds such as acetone, methyl ethyl ketone (MEK), and methyl isobutyl ketone; cyclic ether compounds such as tetrahydrofuran (THF) and dioxolane; ester compounds such as methyl acetate, ethyl acetate, and butyl acetate; aromatic compounds such as toluene and xylene; and alcohol compounds such as carbitol, cellosolve, methanol, isopropanol, butanol, and propylene glycol monomethyl ether. These may be used alone or in a combination of two or more.

The resin composition of the present invention may further contain various additives such as ultraviolet absorbers, antioxidants, silicon-based additives, fluorinated additives, rheology control agents, defoaming agents, antistatic agents, and antifogging agents.

The resin composition of the present invention is suitable for use as a two-part laminate adhesive for bonding various plastic films.

Examples of such plastic films include polycarbonate, polyethylene terephthalate, polymethyl methacrylate, polystyrene, polyester, polyolefin, epoxy resin, melamine resin, triacetylcellulose resin, polyvinyl alcohol, ABS resin, norbornene resin, cyclic olefin resin, polyimide resin, polyvinyl fluoride resin, and polyvinylidene fluoride resin films. The two-part laminate adhesive of the present invention has high adhesion to polyvinyl fluoride resin and polyvinylidene fluoride resin films, which are particularly difficult to bond among the above various films.

When the various films are bonded together, the two-part laminate adhesive of the present invention is preferably used in an amount of 2 to 10 g/m².

A laminated film produced by bonding a plurality of films with the two-part laminate adhesive of the present invention is characterized in that the laminated film has high adhesion under hot and humid conditions and that the films do not peel off easily. The two-part laminate adhesive of the present invention is therefore suitable for laminated films used in harsh environments such as outdoors. Examples of such applications include adhesives for the manufacture of backsheets for solar cells.

The present invention is further illustrated by the following specific examples of synthesis and implementation, although the present invention is not limited thereto.

In the examples herein, the number average molecular weight (Mn) and the weight average molecular weight (Mw) were measured by gel permeation chromatography (GPC) under the following conditions.

Measurement apparatus: HLC-8220 GPC from Tosoh Corporation

Columns: TSK-GUARDCOLUMN SuperHZ-L from Tosoh Corporation+TSK-GEL SuperHZM-M×4 from Tosoh Corporation Detector: differential refractive index (RI) detector Data processing: Multistation GPC-8020 model II from Tosoh Corporation Measurement conditions:
Column temperature 40° C.
Solvent tetrahydrofuran
Flow rate 0.35 ml/min
Standard: monodisperse polystyrene
Sample: microfiltered resin solution in tetrahydrofuran with solid content of 0.2% by mass (100 µl)

Manufacture Example 1

Manufacture of Polyester Polyurethane Polyol (A1) Solution

A flask equipped with a stirrer, a temperature sensor, and a rectifying column was charged with 311 parts by mass of neopentyl glycol, 215 parts by mass of isophthalic acid, 99.7 parts by mass of phthalic anhydride, 156 parts by mass of sebacic acid, 5.8 parts by mass of trimellitic anhydride, and 0.02 part by mass of an organotitanium compound as an esterification catalyst. The mixture was heated to 230° C. to 250° C. with stirring while allowing dry nitrogen to flow through the flask to effect an esterification reaction. The reaction was terminated when the acid value was 1.0 mg KOH/g or less. The reaction product was cooled to 100° C. and was diluted with ethyl acetate to a solid content of 80% by mass. The flask was then charged with 36 parts by mass of isocyanurate of hexamethylene diisocyanurate ("Sumidur N3300" from Sumitomo Bayer Urethane Co., Ltd.) and 7.4 parts by mass of hexamethylene diisocyanate. The mixture was heated to 70° C. to 80° C. with stirring while allowing dry nitrogen to flow through the flask to effect a urethanization reaction. The reaction was terminated when the isocyanate content was 0.3% by mass or less to obtain a polyester polyurethane polyol (A1) having a weight average molecular weight (Mw) of 50,000, a number average molecular weight (Mn) of 6,300, a molecular weight distribution (Mw/Mn) of 7.9, and a hydroxyl value of 10 mg KOH/g. The polyester polyurethane polyol (A1) was diluted with ethyl acetate to a solid content of 62% by mass to prepare a polyester polyurethane polyol (A1) solution.

Manufacture Example 2

Manufacture of Polyester Polyurethane Polyol (A2) Solution

A flask equipped with a stirrer, a temperature sensor, and a rectifying column was charged with 311 parts by mass of neopentyl glycol, 215 parts by mass of isophthalic acid, 99.7 parts by mass of phthalic anhydride, 156 parts by mass of sebacic acid, 5.8 parts by mass of trimellitic anhydride, and 0.02 part by mass of an organotitanium compound. The mixture was heated to 230° C. to 250° C. with stirring while allowing dry nitrogen to flow through the flask to effect an esterification reaction. The reaction was terminated when the acid value was 1.0 mg KOH/g or less. The reaction product was cooled to 100° C. and was diluted with ethyl acetate to a solid content of 80% by mass. The flask was then charged with 25 parts by mass of isocyanurate of hexamethylene diisocyanurate ("Sumidur N3300" from Sumitomo Bayer Urethane Co., Ltd.) and 13.1 parts by mass of hexamethylene diisocyanate. The mixture was heated to 70° C. to 80° C. with stirring while allowing dry nitrogen to flow through the flask to effect a urethanization reaction. The reaction was terminated when the isocyanate content was 0.3% by mass or less to obtain a polyester polyurethane polyol (A2) having a weight average molecular weight (Mw) of 40,000, a number average molecular weight (Mn) of 6,000, a molecular weight distribution (Mw/Mn) of 6.7, and a hydroxyl value of 10 mg KOH/g. The polyester polyurethane polyol (A2) was diluted with ethyl acetate to a solid content of 62% by mass to prepare a polyester polyurethane polyol (A2) solution.

Comparative Manufacture Example 1

Manufacture of Polyester Polyurethane Polyol (a1) Solution

A flask equipped with a stirrer, a temperature sensor, and a rectifying column was charged with 282.6 parts by mass of neopentyl glycol, 275.1 parts by mass of 1,6-hexanediol, 112.8 parts by mass of ethylene glycol, 634.5 parts by mass of isophthalic acid, 368.7 parts by mass of sebacic acid, and 0.02 part by mass of an organotitanium compound as an esterification catalyst. The mixture was heated to 230° C. to 250° C. with stirring while allowing dry nitrogen to flow through the flask to effect an esterification reaction. The reaction was terminated when the acid value was 1.0 mg KOH/g or less. The reaction product was cooled to 100° C. and was diluted with ethyl acetate to a solid content of 80% by mass. The flask was then charged with 68.7 parts by mass of isophorone diisocyanate. The mixture was heated to 80° C. to 90° C. with stirring while allowing dry nitrogen to flow through the flask to effect a urethanization reaction. The reaction was terminated when the isocyanate content was 0.3% by mass or less to obtain a polyester polyurethane polyol (a1) having a weight average molecular weight of 37,000, a number average molecular weight (Mn) of 8,000, a molecular weight distribution (Mw/Mn) of 4.6, and a hydroxyl value of 10 mg KOH/g. The polyester polyurethane polyol (a1) was diluted with ethyl acetate to a solid content of 62% by mass to prepare a polyester polyurethane polyol (a1) solution.

The epoxy resins (B) used in the examples of the present invention and the comparative examples are as follows:

Epoxy resin (B1): bisphenol A epoxy resin ("EPICLON 860" from DIC Corporation) with number average molecular weight (Mn) of 470, epoxy equivalent of 245 g/eq, and hydroxyl value of 54 mg KOH/g Epoxy resin (B2): bisphenol A epoxy resin ("JER 1001" from Mitsubishi Chemical Corporation) with number average molecular weight (Mn) of 900, epoxy equivalent of 475 g/eq, and hydroxyl value of 125 mg KOH/g The hydroxyl values of the above epoxy resins (B) were calculated from the proportions of epoxy resins with different degrees of polymerization present in the epoxy resins (B) measured by GPC and the theoretical hydroxyl values of the epoxy resins with different degrees of polymerization.

The polycarbonate resin (C) used in the examples of the present invention and the comparative examples is as follows:

Polycarbonate polyol (C1): polycarbonate diol ("PRACCEL CD210" from Daicel Corporation) with number average molecular weight (Mn) of 1,000 and hydroxyl value of 110 mg KOH/g The polyisocyanates (D) used in the examples of the present invention and the comparative examples are as follows:

Polyisocyanate (D1): nurate of hexamethylene diisocyanate ("Sumidur N3300" from Sumitomo Bayer Urethane Co., Ltd.)

Polyisocyanate (D2): hexamethylene diisocyanate ("BURNOCK DN955S" from DIC Corporation)

Example 1

A resin composition was prepared by mixing 100 parts by mass of the polyester polyurethane polyol (A1) solution prepared in Manufacture Example 1, 10 parts by mass of the epoxy resin (B1), 15 parts by mass of the polycarbonate polyol (C1), and 15 parts by mass of the polyisocyanate (D1). An evaluation sample was prepared in the following manner and was evaluated by the following methods. The results are shown in Table 1.

Preparation of Evaluation Sample

The resin composition prepared in Example 1 was applied to a 125 μm thick PET film ("X10S" from Toray Industries, Inc.), used as a substrate, such that the mass of the solid left after drying the solvent was 5 to 6 g/m². A 25 μm thick fluoropolymer film ("AFLEX 25PW" from Asahi Glass Co., Ltd.) was then laminated on the PET film to obtain a laminated film. The laminated film was aged at 50° C. for 72 hours to obtain an evaluation sample.

Evaluation 1: Measurement of Adhesive Force under Hot and Humid Conditions

The adhesive force of the evaluation sample prepared in the above manner was evaluated by a T-peel test using a tensile testing machine ("AGS 500NG" from Shimadzu Corporation), where the strength was measured in N/15 mm at a peel speed of 300 mm/min. The initial adhesive force of the evaluation sample and the adhesive forces of the sample after exposure to an environment at 121° C. and a humidity of 100% for 25 hours, 50 hours, and 75 hours were measured.

Evaluation 2: Evaluation of Heat and Moisture Resistance

The initial adhesive force of the evaluation sample measured in Evaluation 1 was compared with the adhesive force of the sample after exposure to an environment at 121° C. and a humidity of 100% for 75 hours. Samples whose adhesive force after exposure was 60% or more of the initial adhesive force were rated as "good". Samples whose adhesive force after exposure was from 40% to less than 60% of the initial adhesive force were rated as "fair". Samples whose adhesive force after exposure was less than 40% of the initial adhesive force were rated as "poor".

Examples 2 to 11

Evaluation samples were prepared and evaluated as in Example 1 except that different resin compositions were used, as shown in Table 1. The evaluation results are shown in Table 1.

Comparative Examples 1 to 3

Evaluation samples were prepared and evaluated as in Example 1 except that different resin compositions were used, as shown in Table 2. The evaluation results are shown in Table 2.

Table 1

TABLE 1

| | | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|
| Main Agent | Polyester polyurethane polyol (A1) solution | 100 | 100 | | 100 | 100 | 100 | | 100 | 100 | 100 | 100 |
| | Polyester polyurethane polyol (A2) solution | | | 100 | | | | 100 | | | | |
| | Epoxy resin (B1) | 10 | 10 | 10 | 20 | 5 | 10 | 10 | 10 | 10 | | |
| | Epoxy resin (B2) | | | | | | | | | | 10 | 5 |
| | Polycarbonate resin (C) | 15 | 15 | 15 | 5 | 20 | 15 | 15 | 15 | 10 | 10 | 10 |
| Curing agent | Polyisocyanate (D1) | 15 | 5 | 5 | 10 | 10 | 5 | 5 | | 10 | 10 | 10 |
| | Polyisocyanate (D2) | | | | | | | | 10 | 10 | 20 | |
| Adhesive force N/15 mm | Initial | 6.5 | 7 | 6.9 | 7 | 5.3 | 7.5 | 7.4 | 8 | 6.3 | 5 | 4.9 |
| | 25 hr at 121° C. and 100% | 5.8 | 5.5 | 5.6 | 5.8 | 4.3 | 6.5 | 6.5 | 7 | 4.9 | 4.3 | 4.3 |
| | 50 hr at 121° C. and 100% | 5.5 | 5.5 | 5.5 | 5.6 | 4.2 | 6.5 | 6.4 | 6.5 | 4.3 | 4.2 | 4.2 |
| | 75 hr at 121° C. and 100% | 4 | 4.4 | 4.3 | 4.5 | 4.3 | 5.8 | 5.9 | 5 | 4.3 | 4.2 | 4.2 |
| Heat and moisture resistance | | Good | Good | Good | Good | Good | Good | Good | Good | Good | Good | Good |

TABLE 2

|  |  | Com. Ex. 1 | Com. Ex. 2 | Com. Ex. 3 |
|---|---|---|---|---|
| Main agent | Polyester polyurethane polyol (A1) | 100 | 100 |  |
|  | Polyester polyurethane polyol (a1) |  |  | 100 |
|  | Epoxy resin (B1) |  | 10 | 10 |
|  | Polycarbonate resin (C) |  |  |  |
| Curing agent | Polyisocyanate (D1) | 15 | 15 | 15 |
| Adhesive force N/15 mm | Initial | 4.5 | 6.7 | 5.7 |
|  | 25 hr at 121° C. and 100% | 2.5 | 4.5 | 3.5 |
|  | 50 hr at 121° C. and 100% | 2.3 | 3.3 | 3.1 |
|  | 75 hr at 121° C. and 100% | 2 | 2.2 | 2.5 |
| Heat and moisture resistance |  | Poor | Poor | Poor |

The invention claimed is:

1. A resin composition containing, as essential components, a polyester polyurethane polyol (A) prepared by reacting a polybasic acid (E), a polyalcohol (F), and a polyisocyanate (G) as essential components, the polybasic acid (E) being a combination of an aliphatic polybasic acid and an aromatic polybasic acid, the polyisocyanate (G) being a nurate-type polyisocyanate compound having a functionality of 3 or more, the polyester polyurethane polyol (A) having a hydroxyl value of 5 to 30 mg KOH/g, having a branched structure in a molecule thereof, and having a weight average molecular weight (Mw) of 25,000 to 200,000 and a molecular weight distribution (Mw/Mn) of 2.5 or more; a hydroxyl-containing epoxy resin (B) having a number average molecular weight (Mn) of 300 to 5,000; a hydroxyl-containing polycarbonate resin (C) having a number average molecular weight (Mn) of 300 to 3,000; and a polyisocyanate (D).

2. The resin composition according to claim 1, wherein the polyester polyurethane polyol (A) is a polyester polyurethane polyol prepared by reacting, as an essential component, a polyisocyanate (G) containing a diisocyanate compound (G1) and a nurate-type polyisocyanate compound having a functionality of 3 or more in a mass ratio [diisocyanate compound (G1)/nurate-type polyisocyanate compound having functionality of 3 or more] of 50/50 to 5/95.

3. The resin composition according to claim 1, wherein the resin composition contains the epoxy resin (B) in an amount of 5 to 20 parts by mass and the polycarbonate resin (C) in an amount of 5 to 20 parts by mass per 100 parts by mass of the polyester polyurethane polyol (A).

4. The resin composition according to claim 1, wherein the ratio [OH]/[NCO] of the total number of moles [OH] of hydroxyl groups contained in the polyester polyurethane polyol (A), the epoxy resin (B), and the polycarbonate resin (C) to the number of moles [NCO] of isocyanate groups contained in the polyisocyanate compound (D) is 1/1 to 1/2.

5. A two-part laminate adhesive containing the resin composition according to claim 1.

6. A laminated film comprising at least one type of film selected from the group consisting of polyester films, fluoropolymer films, polyolefin films, and metal foils; and an adhesive layer comprising the adhesive according to claim 5.

7. A backsheet for solar cells, comprising an adhesive layer comprising the adhesive according to claim 5.

8. A two-part laminate adhesive containing the resin composition according to claim 2.

9. A two-part laminate adhesive containing the resin composition according to claim 3.

10. A two-part laminate adhesive containing the resin composition according to claim 4.

11. A laminated film comprising at least one type of film selected from the group consisting of polyester films, fluoropolymer films, polyolefin films, and metal foils; and an adhesive layer comprising the adhesive according to claim 8.

12. A laminated film comprising at least one type of film selected from the group consisting of polyester films, fluoropolymer films, polyolefin films, and metal foils; and an adhesive layer comprising the adhesive according to claim 9.

13. A laminated film comprising at least one type of film selected from the group consisting of polyester films, fluoropolymer films, polyolefin films, and metal foils; and an adhesive layer comprising the adhesive according to claim 10.

14. A backsheet for solar cells, comprising an adhesive layer comprising the adhesive according to claim 8.

15. A backsheet for solar cells, comprising an adhesive layer comprising the adhesive according to claim 9.

16. A backsheet for solar cells, comprising an adhesive layer comprising the adhesive according to claim 10.

* * * * *